United States Patent [19]
Moriwaki et al.

[11] Patent Number: 6,030,725
[45] Date of Patent: Feb. 29, 2000

[54] NEGATIVE ELECTRODE FOR ALKALINE STORAGE BATTERIES

[75] Inventors: Yoshio Moriwaki, Hirakata; Akihiro Maeda, Kobe; Hirokazu Kimiya, Kyoto; Isao Matsumoto, Osaka, all of Japan

[73] Assignee: Matsushita Electric Industrial Co., Ltd., Osaka, Japan

[21] Appl. No.: 09/047,372

[22] Filed: Mar. 25, 1998

[30] Foreign Application Priority Data

Mar. 28, 1997 [JP] Japan ................................ 9-076995

[51] Int. Cl.⁷ ................................ H01M 4/58; C01B 6/24
[52] U.S. Cl. .................. 429/218.2; 429/223; 429/218.1; 429/206; 420/900
[58] Field of Search ............................ 429/218.1, 218.2, 429/223, 206, 59; 420/900

[56] References Cited

U.S. PATENT DOCUMENTS 5,376,474  12/1994  Tadokoro et al. .................... 429/59
5,900,334  5/1999  Wada et al. ...................... 429/218.2

FOREIGN PATENT DOCUMENTS 0 751 229A1  1/1997  European Pat. Off. ........ C22C 19/00
0751229  2/1997  European Pat. Off. .
1-173573  10/1989  Japan .

OTHER PUBLICATIONS

"Metal Hydride Electrode for High Energy Density Sealed Nickel–Metal Hydride Battery" by H. Ogawa, et al., pp. 393–410, Power Source 12, Research and Development in Non–Mechanical Electrical Power Sources.

Chemical Abstracts, vol. 114, No. 16, Apr. 22, 1991 Kamasaki, et al., Structure and hydrogen absorption characteristics of sputtered lanthanum–nickel alloy films.

*Primary Examiner*—Maria Nuzzolillo
*Assistant Examiner*—Angela J. Martin
*Attorney, Agent, or Firm*—McDermott, Will & Emery

[57] ABSTRACT

The present invention provides alkaline storage batteries of which high-rate discharge characteristic at low-temperature, cycle life, and storage performance at high-temperature are improved in good balance and the cost performance is superior even when the content of cobalt is made extremely low by using in the negative electrode consisting of hydrogen absorbing alloy powders based on MmNi system alloys comprising $MmNi_5$ system alloy which remains mostly crystalline in phase when absorbing hydrogen and $Mm_2Ni_7$ system alloy which turns mostly amorphous in phase upon absorbing hydrogen.

13 Claims, No Drawings

NEGATIVE ELECTRODE FOR ALKALINE STORAGE BATTERIES

II. BACKGROUND OF THE INVENTION

1. Field of the Invention

This invention relates to a negative electrode for alkaline storage batteries based on a hydrogen absorbing alloy that repeats electrochemical absorption and desorption of hydrogen with charging and discharging of the batteries.

2. Description of the Prior Art

An alkaline storage battery is a generic name of secondary batteries that employ alkaline electrolyte solution having potassium hydroxide as the main electrolyte. Most of these battery systems use nickel oxyhydroxide (NiOOH) as the positive active material because of its superior charge-discharge cycle characteristics and long life. A nickel cadmium system which uses cadmium as the negative active material has been the main stream of sealed alkaline storage batteries with a long charge-discharge cycle life and high reliability. Recently, nickel-metal hydride (Ni—MH) based batteries have been commercialized which use a hydrogen absorbing alloy as the negative electrode which is easier to achieve higher capacity than that with a cadmium negative electrode. Although the nominal cell voltage of Ni—MH alkaline storage batteries is 1.2 volts which is the same as that of Ni—Cd systems, demand for Ni—MH batteries has been rapidly growing by replacing Ni—Cd systems because of their high capacity and environmental friendliness. Potential applications of the Ni—MH alkaline storage batteries include small size power supply for portable equipment such as portable telephone, camcorder, and lap-top computer to medium to large size power supply for electric vehicles and hybrid electric vehicles.

Negative electrode of an alkaline storage battery using hydrogen absorbing alloy repeats a cycle of electrochemically absorbing hydrogen, when charging, producing a hydride and, when discharging, desorbing hydrogen thus returning back to the initial alloy. As the hydrogen absorbing alloy for use as a negative electrode of alkaline storage batteries, $LaNi_5$- or $MmNi_5$ (Mm: misch metal)-based $AB_5$ type alloy having a $CaCu_5$ type crystal structure in which a part of the Ni has been substituted by other element such as Co, Mn, or Al is currently in main use. In this type of alloy, Co is known to be an essential additive element as typified by an alloy composition of $MmNi_{3.55}Co_{0.75}M_{0.4}Al_{0.3}$. Here misch metal (Mm) is a mixture of native rare earth metal elements mainly comprising lanthanum (La) and cesium (Cs) and containing praseodymium (Pr), neodymium (Nd), samarium (Sm), etc.

As the negative electrode of alkaline storage batteries, non-sintered electrodes such as electrodes fabricated by either filling a paste prepared by mixing powders of aforementioned $AB_5$ type alloy, binder, and solvent into three-dimensional continuous pores having pore diameters of 100 to 300 μm inside a high-porosity spongy nickel sheet, or paste type electrode fabricated by coating the paste on both sides of a grid made of nickel-plated and perforated steel sheet, are generally employed.

In the above described $AB_5$ type hydrogen absorbing alloy based on $MmNi_5$, Co that substituted part of the Ni has an effect of suppressing performance deterioration of the negative electrode resulting from corrosion of the alloy due to alkaline electrolyte. Cobalt is also considered to have an important function of suppressing the decrease of discharge capacity of the negative electrode and $O_2$ gas absorbing capability due to unrecoverable oxidation caused by $O_2$ gas evolving from the positive electrode during charge and overcharge, or due to the alloy powders becoming finer and finer as a result from repeated hydrogen absorption and desorption accompanying charge and discharge.

In alkaline storage batteries based on Ni—MH systems, further improvements in battery characteristics such as energy density, cycle life, high-rate charge-discharge, and storage performance as well as reduction in cost are problems to be solved in making this type of battery widely accepted as a general use battery.

The cost of Co to be added in the negative electrode alloy is relatively high. Also, since it is produced in limited and localized parts of the world, the supply is unstable and dependent on political situations, and the price tends to fluctuate. It is therefore desirable to minimize the quantity of Co to be added to the alloy as much as possible or preferably to do away with it. However, when the conventional added quantity of Co is reduced to 6 atomic % or less for example, it has been difficult to make a battery having a satisfactory cycle life or storage performance. It has therefore been considered necessary to add Co by 8 to 15 atomic %.

In an effort to reduce the added quantity of Co, much research has been done for a long time in the area of composition, preparation, and surface treatment of alloys. Taking alloy composition as an example, it was studied to form a fine segregation phase within microstructure by changing the ratio of A and B elements of an $AB_5$ type alloy or by adding a new element. In making alloy powders, in place of the conventional method of mechanically pulverizing ingot obtained by casting of molten alloy in a high-frequency furnace, there is proposed an atomizing process in which molten alloy is atomized like spray by an inert gas. With these means, attempts have been made to reduce the quantity of Co addition and yet secure battery performance. As a result, some success has been obtained in securing anti-corrosiveness and resistance to oxidation of $AB_5$ type hydrogen absorbing alloy even though quantity of Co addition is reduced by a certain degree. However, it was found difficult to obtain a superior cycle life and a long storage life in practical batteries.

Also, some proposals have been made regarding surface treatment of alloy powders. Typical examples include a method of etching the surface of alloy powders in an alkaline solution, micro-encapsulating alloy powders by plating nickel or copper on their surface, or covering the surface of alloy powders by forming fluoride layer. However, even with these surface treatments, actual batteries suffered unsatisfactory cycle life and shelf life.

III. SUMMARY OF THE INVENTION

The present invention relates to improvement of $AB_5$ type hydrogen absorbing alloy which is based on misch metal-nickel (MmNi) system alloy with at least a part of the Ni being substituted by Co. The present invention provides a negative electrode for alkaline storage batteries which will further improve high-rate charge-discharge characteristics without affecting cycle life and storage performance even when the quantity of Co added in the alloy is reduced, thereby solving problems in conventional technologies. The invention provides a negative electrode for alkaline storage batteries that employs hydrogen absorbing alloy which is based on MmNi system alloy comprising an alloy most of which remains crystalline in phase when hydrogen is absorbed and an alloy most of which turns amorphous in phase upon absorption of hydrogen. More specifically, the object of the invention is achieved by using $MmNi_5$ system alloy as the alloy most of which remains crystalline in phase when hydrogen is absorbed and $Mm_2Ni_7$ system alloy as the alloy most of which turns amorphous in phase upon hydrogen absorption.

IV. DETAILED DESCRIPTION OF THE INVENTION

Embodiments

Details of the present invention will be explained in the following in terms of preferred embodiments.

First Embodiment

To begin with, as an $MmNi_5$ alloy, an ingot of sample No. 1 alloy is prepared by melting in a high-frequency furnace raw metals leading to a composition of $MmNi_{3.95}Co_{0.15}M_{0.5}Al_{0.4}$ and casting. The content of Co in the alloy is equivalent to 2.5 atomic %. After annealing the ingot at 1,000° C. in vacuum for 6 hours, it was pulverized into powders with an average diameter of 30 μm by a mechanical pulverizing process.

On the other hand, to obtain an $Mm_2Ni_7$ system alloy, an alloy ingot with a composition of $Mm_2Ni_6Mn_{0.9}Al_{0.1}$ is prepared by high-frequency furnace melting and casting as in the case of the above described $MmNi_5$ system alloy. After annealing this ingot at 920° C. in vacuum for 10 hours, it was mechanically pulverized into powders with an average diameter of 20 μm.

By uniformly mixing the above two types of alloy powders of $MmNi_5$ and $Mm_2Ni_7$ systems at mixing ratios shown in Table 1, nine kinds of alloy powder samples were prepared, namely, Sample Nos. 1—1 to 1-9. Negative electrodes were fabricated using these mixed alloy powders, which were then incorporated in Ni—MH type sealed alkaline storage batteries of AA size (R4 type).

First, paste prepared by adding and mixing binder and water to the above nine kinds of mixed alloy powders was filled in a spongy nickel sheet having a porosity of 95% and a thickness of 1.0 mm, which was then dried and pressed to a thickness of 0.35 mm. The sheet was subsequently cut to a 39 mm×100 mm size for use as a formed negative electrode.

A formed nickel positive electrode was fabricated by filling paste mainly comprising nickel hydroxide, $Ni(OH)_2$, being an active material, in a spongy nickel sheet, and by drying, pressing and cutting. A spiral electrode group was fabricated by winding one each of the positive and negative electrodes having pre-welded lead tabs with a separator therebetween. The electrode group is then housed in a cell container, the negative electrode lead tab and the positive electrode lead tab are respectively welded to the inner bottom surface of the cell container and to the inner bottom surface of a cover provided with a safety valve having a press-fit gasket, followed by pouring of alkaline electrolyte thereby impregnating the electrode group and holding the electrolyte therein. Subsequently, the upper peripheral edge of the cell container and the cover are sealed with a gasket in a gas-tight and liquid-tight manner thus completing a cell. As the separator, nonwoven polypropylene cloth was used after hydrophilic treatment of the fiber surfaces by sulfonation. The alkaline electrolyte used here was prepared by dissolving 30 grams of lithium hydroxide ($LiOH.H_2O$) into a liter of aqueous solution of potassium hydroxide (KOH) having a specific gravity of 1.30 at 20° C. Standard capacity of each cell was designed and adjusted to be 1200 mAh (end voltage 1.0 V) at a constant current discharge of ⅕ $C_{mA}$ (240 mA) at 20° C. Here the discharge capacity of each cell is limited by the nickel positive electrode used.

Each cell was subjected to an initial charge and discharge cycle that consisted of 5 cycles of charging for 6 hours at a constant current of ¼ $C_{mA}$ (300 mA) at room temperature and discharging at a constant current of ⅕ $C_{mA}$ (240 mA) until 1.0 V was reached. Subsequently, to confirm characteristics as a sealed alkaline storage battery, high-rate discharge performance at low-temperature, cycle life, and storage performance at high temperature were tested for each cell under the following conditions.

Regarding the discharge characteristic, high-rate discharge performance at low temperature was first studied. After going through an initial charge-discharge cycle, each cell was charged for 6 hours at room temperature at a constant current of ¼ $C_{mA}$ (300 mA). After the cell temperature reached 0° C., each cell was discharged at a constant current of 1 $C_{mA}$ (1200 mA) until 1.0 V is reached thus obtaining the capacity. The high-rate discharge capacity at low-temperature was calculated as a discharge capacity ratio in percent relative to the standard capacity (1200 mA).

The cycle life characteristic was studied by continuously repeating, after initial charge-discharge cycles, cycles of charging each cell for 3 hours at a constant current of ½ $C_{mA}$ (600 mA) and discharging at the same constant current of ½ $C_{mA}$ as the charge current until 1.0 V was reached. The cycle life characteristic is represented by the number of cycles until the discharge capacity decreased to 60% of the initial discharge capacity.

Subsequently, storage performance at high-temperature was studied by leaving cells which have been discharged through initial charge-discharge cycles down to a closed circuit voltage of 1.0 V in an environment of 65° C. and counting the number of days elapsed until the open circuit voltage decreased to 0.8 V.

Table 1 shows results of these tests. The number of test cells used was 5 cells for each test item and the figures in Table 1 show the average of 5 cells.

TABLE 1

| Sample No. | Alloy Content (wt %) | | High-Rate Discharge Performance at Low Temperature (%) | Cycle Life (cycles) | Storage Performance at High Temperature (days) |
| --- | --- | --- | --- | --- | --- |
| | $MmNi_5$ System | $Mm_2Ni_7$ System | | | |
| 1-1 | 100 | 0 | 93 | 77 | 26 |
| 1-2 | 95 | 5 | 92 | 205 | 53 |
| 1-3 | 90 | 10 | 91 | 226 | 58 |
| 1-4 | 70 | 30 | 86 | 258 | 61 |
| 1-5 | 50 | 50 | 82 | 272 | 67 |
| 1-6 | 30 | 70 | 78 | 302 | 72 |
| 1-7 | 10 | 90 | 75 | 315 | 74 |
| 1-8 | 5 | 95 | 70 | 323 | 77 |
| 1-9 | 0 | 100 | 54 | 330 | 82 |

Notes:
$MmNi_5$ system: $MmNi_{3.95}Co_{0.15}Mn_{0.5}Al_{0.4}$
$Mm_2Ni_7$ system: $Mm_2Ni_6Mn_{0.9}Al_{0.1}$ It can be seen from Table 1 that as the mixing ratio of $MmNi_5$ system alloy in the hydrogen absorbing alloy used in the negative electrode decreases and that of $Mm_2Ni_7$ alloy increases, the high-rate discharge capacity at low-temperature tends to decrease. Conversely, the cycle life and storage performance at high-temperature tend to increase. Supposing that, for practical use, a cell performance level of high-rate discharge performance at low-temperature equal to at least 70% of the standard capacity, a cycle life at 45° C. of at least 200 cycles, and storage performance of at least 50 days is required, it can be understood that when the mixing ratio of $Mm_2Ni_7$ system alloy relative to the total alloy is in the range of 5 to 95%, all of the practical cell performance requirements are satisfied in good balance. It can also be understood that by mixing both $MmNi_5$ and $Mm_2Ni_7$ system alloys, synergistic effect of their good points has contributed to improvement of the performance of the negative electrode. In contrast, in sample Nos. 1—1 and 1–9 where either $MmNi_5$ or $Mm_2Ni_7$ system alloy was used alone, the practical performance of the cell was not found satisfactory.

As described earlier, the Co content in the $MmNi_5$ system alloy used in the experiment was 2.5 atomic %, whereas the $Mm_2Ni_7$ system alloy did not contain any Co at all. Therefore, the Co content in the hydrogen absorbing alloy powders for the negative electrode as shown in Table 1 in the First Embodiment ranges from 2.5 atomic % in sample No. 1—1 to 0% in sample No. 1–9. It was already pointed out that when part of the Ni in an $MmNi_5$ system alloy had been substituted by Co, practical performance of the cell used to be unsatisfactory if the Co content was 6 atomic % or less. However, by mixing at least 5 wt % of $Mm_2Ni_7$ system alloy in the $MmNi_5$ system alloy, no adverse effect is caused even when the Co content within the entire alloy is 6 atomic % or less as the results in Table 1 suggest.

Subsequently, each cell tested was disassembled and X-ray diffraction analysis, electron microscopic observation of fineness of alloy powders, and quantitative analysis of the composition dissolved out into alkaline electrolyte were performed on the hydrogen absorbing alloy of the negative electrode. Omitting presentation of detail data here, it was found that with increasing mixing ratio of $Mm_2Ni_7$, crystallinity of the alloy decreases, and fining of the alloy powders and the quantity of metal dissolution from the alloy powders tend to be suppressed.

For the purpose of further studying the effect of Co content in the hydrogen absorbing alloy, five other compositions of $MmNi_5$ system alloy other than the sample No. 1, i.e., $MmNi_{3.95}Co_{0.15}Mn_{0.5}Al_{0.4}$ (Co: 2.5 atomic %), were studied using $Mm_2Ni_6Mn_{0.9}Al_{0.1}$ alloy as the $Mm_2Ni_7$ system alloy to be mixed just as in the case of the $MmNi_5$ system alloy in sample No. 1. AA-size cells were then fabricated and cell performance was tested in the same manner.

Compositions of the newly studied $MmNi_5$ system alloys were as follows.

Sample No. 2: $MmNi_{3.55}Co_{0.75}Mn_{0.4}Al_{0.3}$ alloy (Co: 12.5 atomic %)

Sample No. 3: $MmNi_{3.75}Co_{0.55}Mn_{0.4}Al_{0.3}$ alloy (Co: 9.2 atomic %)

Sample No. 4: $MmNi_{3.75}Co_{0.35}Mn_{0.5}Al_{0.4}$ alloy (Co: 5.8 atomic %)

Sample No. 5: $MmNi_{4.0}Co_{0.05}Mn_{0.55}Al_{0.4}$ alloy (Co: 0.8 atomic %)

Sample No. 6: $MmNi_{4.05}Mn_{0.55}Al_{0.4}$ alloy (Co: 0 atomic %)

Omitting presentation of detail data, as the Co content in the entire alloy decreased the cycle life and storage performance tended to decrease. Cells that used, among the newly studied $MmNi_5$ system alloy sample Nos. 2 to 6, alloy powders of either sample Nos. 4, 5 or 6 alone, all of which having a Co content of 6 atomic % or less, were found not to satisfy practical performance requirements as were conventional cells. However, even when these alloy powders were used, it was found possible to satisfy practical cell performance requirements by mixing $Mm_2Ni_7$ system alloy by at least 5 wt %.

As an $Mm_2Ni_7$ system alloy to be mixed with various compositions of $MmNi_5$ system alloy, $Mm_2Ni_6Mn_{0.9}Al_{0.1}$ alloy was used as an example for explanation. However, the present invention is also valid when one uses as the $Mm_2Ni_7$ system alloy which consists mainly of a phase which turns amorphous upon absorption of hydrogen, $Mm_2Ni_7$ alloy as well as an alloy in which part of its Ni has been substituted by at least one element from the group of Al, Mn, Fe, Co and Cu. For instance, the present invention is expected to exhibit good effect in ternary system alloys such as $Mm_2Ni_{6.5}Mn_{0.5}$ and $Mm_2Ni_{6.7}Co_{0.3}$, or even quaternary or higher system alloys as represented by compositions such as $Mm_2Ni_{6.1}Mn_{0.5}Cu_{0.4}$, $Mm_2Ni_{6.5}Al_{0.3}Fe_{0.2}$, or $Mm_2Ni_{6.4}Al_{0.3}Fe_{0.2}Co_{0.1}$.

Various compositions of $MmNi_5$ system alloys have a high activity of electrochemical reaction as negative electrode materials for alkaline storage batteries. Also, after repetition of hydrogen absorption and desorption, the crystalline phase remains dominant. However, when $MmNi_5$ system alloys are used alone in a negative electrode, unless the content of Co to substitute part of its Ni is made high, acceptable cell performance would not be exhibited as described earlier.

In contrast to the above, although various compositions of $Mm_2Ni_7$ system alloys intrinsically consist mainly of crystalline phase, they turn amorphous upon absorption of hydrogen. Even in a state of desorption of hydrogen after repeated absorption and desportion of hydrogen through charge and discharge, their crystal structure remains mostly amorphous in phase. Also, they have excellent anti-corrosion and anti-oxidation properties, and the alloy powders do not become finer even after repeating absorption and desorption of hydrogen through charge and discharge. Consequently, when these types of alloys are employed in negative electrodes of alkaline storage batteries, they are effective in suppressing deterioration of cycle life and storage performance. Furthermore, these $Mm_2Ni_7$ system alloys have a large capacity of electrochemically absorbing hydrogen produced by charging. On the other hand, possibly because they are amorphous and have a relatively low content of Ni which would exhibit catalytic function at time of electrode reaction, activity of electrode reaction is low. For this reason, when compared with $MmNi_5$ system alloys, $MmNi_7$ system alloys have the disadvantage of having lower discharge capacity at room temperature and inferior discharge performance especially at low temperature and at high rate.

The present invention provides negative electrodes for alkaline storage batteries which use MmNi system hydrogen absorbing alloy comprising $MmNi_5$ system alloy that has an excellent activity of electrode reaction and that remains mostly crystalline in phase at the state of hydrogen absorption even after repeating hydrogen absorption and desorption, and $Mm_2Ni_7$ system alloy that has excellent anti-corrosion and anti-oxidation properties, and do not become substantially finer by repeating absorption and desorption of hydrogen, and turns mainly amorphous in phase at the state of hydrogen absorption. By synergistically utilizing strong points of both alloys while complementing weak points, these negative electrodes assure splendid overall performance when used in alkaline storage batteries. A special mention has to be made that the purpose can be achieved by making the mixing ratio of $Mm_2Ni_7$ system alloy in the range from 5 to 95 wt % even when the content of Co in the entire alloy is extremely low.

In the foregoing description of $MmNi_5$ system and $Mm_2Ni_7$ system alloys, they were respectively referred to as an alloy that remains mostly crystalline in phase and an alloy that turns mainly amorphous in phase. The following makes the meaning of these expressions clear. In general industrial manufacturing process of hydrogen absorbing alloys, it is difficult to prepare $MmNi_5$ system alloys that totally consist of uniform crystalline phase. In practice, it is generally the case that some amount of segregation phase also exists. Same thing applies to the state of $Mm_2Ni_7$ system alloy after hydrogen absorption. Consequently, in the present invention, alloys described to remain mostly crystalline in phase or to turn mainly amorphous in phase include alloys that remain in uniform crystalline phase or that turn amorphous in phase as well as alloys in which some segregation phase exists together with these phases.

Second Embodiment

As in the First Embodiment, powders having a composition of $MmNi_{3.95}Co_{0.15}Mn_{0.5}Al_{0.4}$ and having an average particle diameter of 30 $\mu$m are prepared as $MmNi_5$ system alloy powders.

Subsequently, mechanical pulverization of $Mm_2Ni_7$ system alloy as represented by a composition $Mm_2Ni_6Mn_{0.9}Al_{0.1}$ which was used in the First Embodiment was further carried to obtain powders having 5 to 10 $\mu$m particle diameter.

After mixing powders of the above-mentioned $MmNi_5$ system and $Mm_2Ni_7$ system alloys at mixing ratios of 70:30, 50:50, and 30:70 in wt %, the mixed powders were subjected to mechano-fusion processing in an argon (Ar) atmosphere using Type No. AM-15F mechano-fusion equipment made by Hosokawa Micron Co., Ltd.

Electron microscope observation of the processed powders of different mixing ratios revealed alloy powders having double-layered structure in which the surface of $MmNi_5$ system alloy particles having an approximate diameter of 30 $\mu$m had been integrally covered with fine particles of $Mm_2Ni_7$ system alloy.

Similarly to the First Embodiment, negative electrodes were fabricated using 3 mixtures of double-layered alloy powders, i.e., sample No. MF-4, -5, and -6, followed by fabricating AA-size cells using these negative electrodes. Cell performance of these cells were tested on the same conditions as in the First Embodiment. Table 2 shows the results of the test.

TABLE 2

| Sample No. | Alloy Content (wt %) | | High-Rate Discharge Performance at Low Temperature (%) | Cycle Life (cycles) | Storage Performance at High Temperature (days) |
| --- | --- | --- | --- | --- | --- |
| | $MmNi_5$ System | $Mm_2Ni_7$ System | | | |
| MF-4 | 70 | 30 | 91 | 283 | 71 |
| 1-4 | 70 | 30 | 86 | 258 | 61 |
| MF-5 | 50 | 50 | 84 | 297 | 73 |
| 1-5 | 50 | 50 | 82 | 272 | 67 |
| MF-6 | 30 | 70 | 80 | 335 | 80 |
| 1-6 | 30 | 70 | 78 | 302 | 72 |

Notes:
$MmNi_5$ system: $MmNi_{3.95}Co_{0.15}Mn_{0.5}Al_{0.4}$
$Mm_2Ni_7$ system: $Mm_2Ni_6Mn_{0.9}Al_{0.1}$ For the sake of comparison, test results of sample Nos. 1-4, 1-5, and 1-6 in Table 1 of the First Embodiment which have the same compositions and the same mixing ratios as in the present Second Embodiment are also shown in Table 2.

From Table 2, it can be seen that even when using $MmNi_5$ system and $Mm_2Ni_7$ system alloys having the same compositions and with the same mixing ratios as that in the First Embodiment, high-rate discharge performance at low-temperature, cycle life, and storage performance at high-temperature could all be improved over the First Embodiment in which the two alloys were simply mixed, by integrally covering the surface of $MmNi_5$ system alloy cores with $Mm_2Ni_7$ system alloy by means of mechano-fusion.

Third Embodiment

In this embodiment, in preparing double-layered hydrogen absorbing alloy powders, spherical or tear-drop like powders made by an atomizing process instead of the mechanical pulverizing process as used in the First and Second Embodiments were used as the $MmNi_5$ system alloy powders to be used as the core.

As the $MmNi_5$ system alloy, an alloy having a composition of $MmNi_{3.95}Co_{0.15}Mn_{0.5}Al_{0.4}$ was used as in the First and Second Embodiments. To begin with, molten alloy of the above composition was prepared by high-frequency furnace melting. The molten alloy was then dropped in Ar atmosphere while being blown with high-pressure Ar gas thereby being atomized. Powders having an approximate particle diameter of 30 $\mu$m were obtained by sieving the powders thus produced. These alloy powders were nearly spherical in shape with a relatively smooth surface having a metallic gloss. As a result of compositional analysis of the alloy powder samples taken from several positions, it was confirmed that alloy powders with less dispersion and higher uniformity of composition had been obtained compared with the First and Second Embodiments. After heat-treating these alloy powders at 1,000° C. in vacuum for 6 hours, their surfaces were covered with $Mm_2Ni_7$ system alloy powders by mechano-fusion process as in the Second Embodiment.

The $Mm_2Ni_7$ system alloy used had the same composition of $Mm_2Ni_6Mn_{0.9}Al_{0.1}$ as in the Second Embodiment and had been mechanically pulverized to 5 to 10 $\mu$m. The mixing ratio of the $MmNi_5$ system alloy and the $Mm_2Ni_7$ system alloy was chosen to be the same as in the Second Embodiment.

Similarly to the First Embodiment, negative electrodes were fabricated using the three types of double-layered alloy powders, i.e., sample Nos. MF-4A, -5A, and -6A, followed by fabricating AA-size cells using these negative electrodes. The performance of these cells were tested on the same conditions as in the First Embodiment. Table 3 shows results of the test.

Table 3

TABLE 3

| Sample No. | Alloy Content (wt %) | | High-Rate Discharge Performance at Low Temperature (%) | Cycle Life (cycles) | Storage Performance at High Temperature (days) |
| --- | --- | --- | --- | --- | --- |
| | $MmNi_5$ System | $Mm_2Ni_7$ System | | | |
| MF-4A | 70 | 30 | 93 | 298 | 74 |
| MF-4 | 70 | 30 | 91 | 283 | 71 |
| MF-5A | 50 | 50 | 86 | 310 | 76 |
| MF-5 | 50 | 50 | 84 | 297 | 73 |
| MF-6A | 30 | 70 | 83 | 349 | 86 |
| MF-6 | 30 | 70 | 80 | 335 | 80 |

Notes:
$MmNi_5$ system: $MmNi_{3.95}Co_{0.15}Mn_{0.5}Al_{0.4}$
$Mm_2Ni_7$ system: $Mm_2Ni_6Mn_{0.9}Al_{0.1}$ For the sake of comparison, test results of sample Nos. MF-4, MF-5, and MF-6 in Table 2 of the Second Embodiment which have the same compositions and the same mixing ratios as the present Third Embodiment are also shown in Table 3.

From the results of Table 3, it can be seen that $MmNi_5$ system alloy powders for use as the cores of double-layered hydrogen absorbing alloy powders prepared by atomizing process of this Third Embodiment have exhibited improvements in all of high-rate discharge performance at low-temperature, cycle life, and storage performance at high-temperature over those produced by using MmNi$_5$ system alloy powders prepared by mechanical pulverizing process. The reason for these improvements are not clear but is surmised to be due to the fact that the MmNi$_5$ system alloy powders prepared by atomization process are homogeneous in composition with relatively smooth surface and nearly spherical shape, thereby making it possible to uniformly and securely cover them with fine powders of Mm$_2$Ni$_7$ system alloy. Here, fine powders of the Mm$_2$Ni$_7$ system alloy may be prepared either by mechanical pulverizing process or atomization process.

In the First, Second, and Third Embodiments, it was disclosed that by using as the negative electrode MmNi system alloy powders prepared by mixing MmNi$_5$ system alloy and Mm$_2$Ni$_7$ system alloy with predetermined mixing ratios and double-layered MmNi system alloy powders prepared by covering by mechano-fusion process the surface of cores of MmNi$_5$ system alloy powders prepared by mechanical pulverizing process or atomization process with fine powders of Mm$_2$Ni$_7$ system alloys, batteries having superior practical performance could be obtained in which high-rate discharge performance at low-temperature, cycle life, and storage performance at high-temperature are well balanced.

The process in the present invention can be implemented in mass production not only by the foregoing methods but also by an atomization process by adequately controlling the conditions, such as utilitizing the difference in melting points due to the difference in metal compositions. As an example, after weighing each component metal so as to make a composition of MmNi$_{3.7}$Co$_{0.1}$Mn$_{0.4}$Al$_{0.3}$, molten alloy is prepared by high-frequency furnace melting. The composition of this alloy is such that for each Mm atom of A-site atom, the total of B-site atoms Ni, Co, Mn, and Al is equal to 4.5. Atomized alloy powders are obtained by injecting Ar gas at a pressure lower than that of the Third Embodiment while the molten alloy is being dropped in Ar atmosphere. The powders thus obtained are nearly spherical with an average particle diameter of 45 μm. By using these powders, an effect equivalent to that of the above embodiments has been exhibited.

After heat treatment of these powders at 1,000° C. in vacuum for 2 hours, X-ray diffraction analysis and microstructure analysis were conducted. As a result, it was found that MmNi$_5$ system alloy and Mm$_2$Ni$_7$ system alloy were existing at an approximate ratio of 2:1, with more MmNi$_5$ system alloy existing in the center of alloy powders and more Mm$_2$Ni$_7$ system alloy existing on the surface of powders.

As was the case in the First Embodiment, mechanically pulverized powders of ingots of MmNi$_{3.95}$Co$_{0.15}$Mn$_{0.5}$Al$_{0.4}$ as an alloy of the MmNi$_5$ system and Mm$_2$Ni$_6$Mn$_{0.9}$Al$_{0.1}$ as an alloy of the Mm$_2$Ni$_7$ system were then mixed. Subsequently, 1 liter of an alkaline aqueous solution was prepared by dissolving 40 grams of LiOH.H$_2$O into 1 liter of KOH with a specific gravity of 1.3 and by further dissolving cobalt hydroxide equivalent to 1 wt % of the mixed alloy powder, into which 200 grams of the mixed alloy powders were introduced followed by stirring for 1 hour at 80° C. and drying after thorough washing.

Through such treatment by heated alkaline solution, Mm, Mn, and Al on the alloy powder surfaces etch out and Ni remains on the surfaces because it is insoluble. Although Co dissolves to a certain degree, it appears likely that Co ions dissolving when Mm, Mn, and Al on the alloy powder surfaces etch out are substituted thus depositing as metallic Co on the alloy powder surfaces, thereby resulting in higher contents of Ni and Co on the alloy powder surfaces than the inside.

When mixed alloy powders treated by heated alkaline solution in this way were used as a negative electrode, it not only provided cycle life and storage performance at high-temperature equivalent to that of the First Embodiment but it also provided approximately 3% higher capacity in high-rate discharge characteristic at low-temperature and approximately 30 mV higher discharge voltage. Further, the cell internal pressure during quick charge at 1 C$_{mA}$ (1200 mA) was also reduced to half that of cells which did not have thermal alkaline processing.

By further modifying with fine Ni powders the alloy powder surfaces having high Ni and Co contents on the surfaces owing to thermal alkaline processing, high-rate discharge characteristic at low-temperature and quick charge characteristic can be improved. By making surface modification with Ni, the discharge capacity improved by approximately 1% and the discharge voltage increased by approximately 10 mV. It was also possible to decrease the internal cell pressure during quick charge to approximately ⅓. As the method of surface modification, ultrafine Ni powders having an average particle diameter of 0.03 μm were mixed in a quantity equal to 2 wt % of the thermal alkaline processed alloy powders, and subsequently subjected to mechano-fusion processing.

The effect of ultrafine Ni powders as a conductive agent is exhibited even when they were simply added and mixed without mechano-fusion processing. As conductive agents, Cu powders and carbon powders such as graphite or carbon black can also be applied instead of Ni.

As described above in detail, the present invention provides alkaline storage batteries of which the practical performance such as high-rate discharge characteristic at low-temperature, cycle life, and storage performance at high-temperature are improved in good balance and with a superior cost/performance even when the Co content is as such exceptionally low level as 6 atomic % or less. This is made possible by using as the negative electrode for alkaline storage batteries hydrogen absorbing alloy which is based on MmNi system alloy comprising an alloy most of which remains crystalline in phase when hydrogen is absorbed and an alloy most of which turns amorphous in phase once hydrogen is absorbed. Furthermore, the discharge performance and quick charge performance can also be improved by treatment of heated alkaline solution and addition of a conductive agent.

What is claimed is:

1. A negative electrode for alkaline storage batteries using hydrogen absorbing alloy powders based on a misch metal-nickel system, said absorbing alloy powders having surfaces at least partly covered with an alloy, wherein a substantial part of the alloy powders remain in the crystalline phase when hydrogen is absorbed and wherein a substantial part of the alloy partly covering said surfaces of said powders turns amorphous upon absorbing hydrogen.

2. A negative electrode for alkaline storage batteries as recited in claim 1, wherein said absorbing alloy powders is MmN$_5$ system alloy and the alloy which turns amorphous upon absorbing hydrogen is Mm$_2$Ni$_7$ system alloy.

3. A negative electrode for alkaline storage batteries as recited in claim 2, wherein part of the nickel in the Mm2Ni7 system alloy is substituted by at least one kind of element chosen from the group of aluminum, manganese, iron, cobalt, and copper.

4. A negative electrode for alkaline storage batteries as recited in claim 1, wherein the content of cobalt relative to the whole alloy is 6 atomic % or less.

5. A negative electrode for alkaline storage batteries as recited in claim 1, wherein at least said alloy powders are prepared by atomization process.

6. A negative electrode for alkaline storage batteries as recited in claim 1, wherein the contents of nickel and cobalt on the surface of hydrogen absorbing alloy powders are higher than the inside of the hydrogen absorbing alloy powders.

7. A negative electrode for alkaline storage batteries as recited in claim 1, wherein at least one kind of conductive agent chosen from a group of nickel, copper, and carbon is added and mixed to the hydrogen absorbing alloy powders.

8. A negative electrode for alkaline storage batteries as recited in claim 2, wherein the content of cobalt relative to the whole alloy is 6 atomic % or less.

9. A negative electrode for alkaline storage batteries as recited in claim 2, wherein at least said alloy powders are prepared by atomization process.

10. A negative electrode for alkaline storage batteries as recited in claim 2, wherein the contents of nickel and cobalt on the surface of hydrogen absorbing alloy powders are higher than the inside of the hydrogen absorbing alloy powders.

11. A negative electrode for alkaline storage batteries as recited in claim 2, wherein at least one kind of conductive agent chosen from a group of nickel, copper, and carbon is added and mixed to the hydrogen absorbing alloy powders.

12. A negative electrode for alkaline storage batteries as recited in claim 1, wherein at least the alloy that turns amorphous upon absorption of hydrogen is prepared by an atomization process.

13. A negative electrode for alkaline storage batteries as recited in claim 2, wherein at least the alloy that turns amorphous upon absorption of hydrogen is prepared by an atomization process.

* * * * *